US011401182B2

(12) United States Patent
Favero et al.

(10) Patent No.: US 11,401,182 B2
(45) Date of Patent: Aug. 2, 2022

(54) PROCESS FOR TREATMENT OF AQUEOUS EFFLUENT

(71) Applicant: S.P.C.M. SA, Andrezieux-Boutheon (FR)

(72) Inventors: Cédrick Favero, Andrezieux Boutheon (FR); Morgan Tizzoti, Andrezieux Boutheon (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 372 days.

(21) Appl. No.: 16/330,818

(22) PCT Filed: Sep. 8, 2017

(86) PCT No.: PCT/EP2017/072628
§ 371 (c)(1),
(2) Date: Mar. 6, 2019

(87) PCT Pub. No.: WO2018/046687
PCT Pub. Date: Mar. 15, 2018

(65) Prior Publication Data
US 2019/0233313 A1 Aug. 1, 2019

(30) Foreign Application Priority Data
Sep. 9, 2016 (FR) ...................... 1658425

(51) Int. Cl.
*C02F 1/52* (2006.01)
*C02F 1/56* (2006.01)
*B01D 21/01* (2006.01)
*C02F 11/147* (2019.01)
*C02F 1/10* (2006.01)
*C02F 103/10* (2006.01)

(52) U.S. Cl.
CPC ............ *C02F 1/5272* (2013.01); *B01D 21/01* (2013.01); *C02F 1/5236* (2013.01); *C02F 1/56* (2013.01); *C02F 2103/10* (2013.01)

(58) Field of Classification Search
None
See application file for complete search history.

(56) References Cited

U.S. PATENT DOCUMENTS

| 4,382,864 | A | 5/1983 | Hashimoto et al. |
| 5,433,865 | A | 7/1995 | Laurent |
| 6,203,711 | B1 * | 3/2001 | Moffett ............... C02F 1/5236 209/5 |
| 8,888,957 | B2 | 11/2014 | Solhage et al. |
| 9,249,039 | B1 * | 2/2016 | Roa-Espinosa ....... C02F 1/5245 |
| 9,656,882 | B2 | 5/2017 | Nichols et al. |
| 2005/0061750 | A1 * | 3/2005 | Fabri ..................... C02F 1/56 210/728 |
| 2011/0000854 | A1 | 1/2011 | Nichols et al. |
| 2013/0269894 | A1 | 10/2013 | Solhage et al. |
| 2014/0124454 | A1 | 5/2014 | Nichols et al. |
| 2015/0151990 | A1 | 6/2015 | Bara et al. |
| 2015/0315056 | A1 | 11/2015 | Freres |

FOREIGN PATENT DOCUMENTS

CN 105217765 A 1/2016
RU 0002274692 C2 3/2005

OTHER PUBLICATIONS

International Search Report for PCT/EP2017/072628, dated Sep. 27, 2017.
Written Opinion for PCT/EP2017/072628, dated Sep. 27, 2017.
Preliminary Search Report for FR 1658425, dated Feb. 14, 2017.
Daoji, et al., "Experiment of Chitosan Flocculant In Yellow-River High Turbid Water Treatment", Jun. 1996, pp. 65-68, vol. 11, No. 2, Journal of Shandong Architectural and Civil Engineering Institute.

* cited by examiner

Primary Examiner — Clare M Perrin
(74) Attorney, Agent, or Firm — B. Aaron Schulman, Esq.; Stites & Harbison, PLLC

(57) ABSTRACT

The invention relates to the treatment of mine tailings in the form aqueous effluents comprising solid particles. With the process of the invention it is possible to separate all or part of the water from an aqueous effluent comprising solid particles. This process comprises (a) adding to the effluent at least one anionic modified natural polymer selected from among anionic guar gums and/or anionic starches, then (b) adding at least one cationic modified natural polymer selected from among cationic starches and/or cationic dextrans and/or cationic chitosans.

The invention also relates to a composition comprising an aqueous effluent comprising solid particles treated with an anionic modified natural polymer and a cationic modified natural polymer. Preferably, it concerns a composition comprising an aqueous effluent comprising solid particles, at least one anionic modified natural polymer selected from among anionic guar gums and/or anionic starches, and at least one cationic modified natural polymer selected from among cationic starches and/or cationic dextrans and/or cationic chitosans.

16 Claims, No Drawings

PROCESS FOR TREATMENT OF AQUEOUS EFFLUENT

The invention relates to the treatment of mine tailings in the form of aqueous effluents comprising solid particles. With the process of the invention, it is possible to separate all or part of the water from an aqueous effluent comprising solid particles. This process comprises (a) adding at least one anionic modified natural polymer to the effluent, then (b) adding at least one cationic modified natural polymer.

The invention also relates to a composition comprising an aqueous effluent comprising solid particles treated with two modified natural polymers of opposite charge. Preferably, it relates to a composition comprising an aqueous effluent comprising solid particles, at least one anionic modified natural polymer, and at least one cationic modified natural polymer.

Numerous mining extraction processes produce tailings in the form of aqueous effluents comprising solid particles. For example, the production of hydrocarbons from bituminous or oil sands leads to such mine tailings. The management of mine tailings is therefore a major challenge in the mining industry, in particular since the start of production from oil-bearing sands. It is therefore incumbent upon operators to determine how to remove these by-products in secure and efficient manner. The challenge is all the greater on account of the large scale of mining operations from oil sands.

In general, mining operations also produce such tailings or waste materials when extracting ores for the production of coal, diamonds, phosphate or different metals e.g. aluminium, platinum, iron, gold, copper, silver, etc. Such tailings may also result from the processing of ores or from industrial or washing processes.

Mine tailings may be in different forms, in particular a sludge. In general, they are suspensions of solid particles in water.

In general, mine tailings from oil sands are composed of water, clay, sand and residual hydrocarbons derived from the mine extraction process.

Up until now, current practice in the industry has been to pump the tailings into vast settling ponds. The heaviest material, mainly sand, deposits at the bottom whilst the water rises to the surface and can be recycled. The intermediate layer known as mature fine tailings (MFTs), is generally composed of 70% water and 30% fine clay particles.

Evidently, the layer of mature fine tailings could take centuries to solidify. The continuing development of mining operations has required the creation of an increasing number of ever larger settling ponds.

Therefore, the mineral sludge produced by physical or chemical treatment methods of oil sands is stored in open-air basins, ponds, holding dams or semi-liquid embankments. These large volumes of stored sludge therefore create a true hazard, in particular in the event of rupture of dykes.

Having particular regard to technical, environmental or regulatory requirements, it is henceforth necessary to find means to accelerate or improve the efficacy of transforming mature fine tailings to a firm deposit than can subsequently be reclaimed.

Land reclamation after mining operations has become compulsory under environmental rules and regulations.

There is also a need for accelerated treatment of mine tailings, by increasing the rate of sedimentation thereof for efficient recycling of water and to reduce waste volume.

In general, the separation and recycling of all or part of the water contained in mining aqueous effluent are essential objectives for a mining operation. For example, methods for treating aqueous effluent containing solid particles essentially aim at improving the yield of water separation, particularly for the purpose of recycling the separated water and to allow easy handling of the final residue. The increase of this yield, net water release (NWR), is a major target of methods to treat aqueous effluent containing solid particles.

Methods are known for the physical treatment of these mine tailings, e.g. centrifugation, filtration, electrophoresis and electrocoagulation.

There is also an emergence of chemical processes. For example, processes are known involving the addition of chemical products such as sodium silicate, organic flocculants, inorganic coagulants, oxidization agents, reducing agents or carbon dioxide. The use is also known of synthetic polymers as coagulants or flocculants, to separate the solids from the liquid.

As a result, although techniques for treating mine tailings exist, these techniques do not provide a fully efficient solution to the problems encountered, in particular from a technical, environmental or public order viewpoint.

It is consequently necessary to have processes available that allow solutions to be found for all or part of the problems encountered in prior art processes.

The invention therefore provides a process for treating an aqueous effluent comprising solid particles, comprising:
 (a) adding at least one anionic modified natural polymer to the effluent, then
 (b) adding at least one cationic modified natural polymer.

According to one preferred aspect of the invention, the anionic modified natural polymer is an anionic modified natural polysaccharide and the cationic modified natural polymer is a cationic modified natural polysaccharide.

Preferably, the invention provides a process for treating an aqueous effluent comprising solid particles, comprising:
 (a) adding to the effluent at least one anionic modified natural polysaccharide selected from among anionic guar gums and/or anionic starches and/or anionic dextrans, then
 (b) adding at least one cationic modified natural polysaccharide selected from among cationic starches and/or cationic dextrans and/or cationic chitosans.

The treatment process of the invention therefore comprises:
 (a) treating the solid particles contained in the effluent by means of at least one anionic modified natural polymer;
 (b) treating the particles obtained after step (a) with a cationic modified natural polymer.

Preferably, the process of the invention is such that the anionic modified natural polymer is an anionic modified natural polysaccharide, preferably selected from among anionic guar gums and/or anionic starches.

Advantageously, the process of the invention is such that the cationic modified natural polymer is a cationic modified natural polysaccharide, preferably selected from among cationic starches and/or cationic dextrans and/or cationic chitosans.

Preferably, the treatment process of the invention comprises:
 (a) treating the solid particles contained in the effluent by means of an anionic modified natural polymer selected from among anionic guar gums and/or anionic starches;
 (b) treating the particles obtained after step (a) with a cationic modified natural polymer selected from among cationic starches and/or cationic dextrans and/or cationic chitosans.

According to the invention, the effluent is advantageously mine extraction effluent derived from coal mines, diamond mines, phosphate mines, metal mines such as aluminium, platinum, iron, gold, copper, silver etc., . . . .

The effluent may also be effluent from the mining extraction of bituminous sands or oil sands.

Preferably, the effluent is effluent from the mining extraction of bituminous sand or oil sand. In addition to the solid particles, the effluent comprises water. It may comprise sand, clay and water or else sand, clay, water and residual bitumen.

In general, the aqueous effluent of the invention comprises 5 to 70% by weight, preferably 20 to 50% by weight, more preferably 30 to 40% by weight of solid particles, in particular mineral particles particularly selected from among clay, sand or mixtures thereof.

The effluent treated according to the process of the invention may comprise different tailings. These tailings may be fresh tailings or fine tailings. Preferably, it is an effluent comprising mature fine tailings (MFTs) or an effluent comprising fresh fine tailings (FFTs), in particular it is an effluent comprising mature fine tailings (MFTs), and more particularly it is an effluent comprising mature fine tailings (MFTs) containing clay in an amount ranging from 5 to 70% by weight.

In general, the aqueous effluent derived from mining extraction of bituminous sand and treated according to the invention may also comprise residual bitumen. Residual bitumen is then contained in small quantities generally a quantity lower than 5% by weight of aqueous effluent.

The anionic modified natural polymers and cationic modified natural polymers of the invention are semi-biosourced polymers. By semi-biosourced polymers it is meant to designate all semi-natural polymers. Semi-natural polymers are obtained by chemical or enzymatic modification of natural polymers derived from biomass. As chemically modified polymers mention can be made of chemically modified polysaccharides for example, such as anionic starches, anionic guar gums, cationic starches, cationic dextrans. The different chemical reactions allowing these modified polysaccharides to be obtained are known to persons skilled in the art. These reactions are described in the document by Ian Cumpstey, "Chemical Modification of Polysaccharides," ISRN Organic Chemistry, vol. 2013.

According to the invention, the anionic modified natural polymer is used as primary treatment agent, and the cationic modified natural polymer is used as secondary treatment agent.

Preferably, for the process of the invention, the anionic modified natural polymer is added in an amount by weight ranging from 10 to 10 000 ppm relative to the quantity of solid particles contained in the aqueous effluent. From a practical viewpoint, it is added in an amount ranging from 10 to 10 000 g per tonne of solid particles contained in the aqueous effluent.

Also preferably, the anionic modified natural polymer has a molecular weight ranging from 3 to 50 million g/mol. Also, the molecular weight of the anionic modified natural polymer may range from 5 to 30 million g/mol.

The degree of substitution corresponds to the mean number of substituted hydroxyl groups per monomeric unit (ose or monosaccharide). One preferred analysis technique of the invention to determine the degree of substitution is 1H, 13C, 2D nuclear magnetic resonance (NMR) or determination of the degree of anionicity or cationicity contributed by substitution e.g. via colloidal titration.

Preferably the anionic modified natural polymer has a degree of substitution of between 0.01 and 3, preferably between 0.1 and 2, more preferably between 0.2 and 0.7.

Also preferably, the anionic modified natural polymer has a charge density of between 0.1 and 15 meq/g, more preferably between 0.2 and 10 meq/g.

Anionic charge density is calculated from the degree of substitution of the anionic modified natural polymer.

Charge density is calculated using the following formula:

$$\text{Charge density} = (\text{degree of substitution}/\text{Average molar mass in number of monomers}) \times 1000$$

Preferably, for the process of the invention, the anionic modified natural polymer is an anionic guar gum.

Preferably, for the process of the invention, the cationic modified natural polymer is added in an amount by weight ranging from 50 to 1 000 ppm relative to the quantity of solid particles contained in the aqueous effluent. From a practical viewpoint, it is added in an amount ranging from 50 to 1 000 g per tonne of solid particles contained in the aqueous effluent.

Also preferably, the cationic modified natural polymer has a molecular weight ranging from 100 000 to 50 million g/mol. Also, the molecular weight of the cationic modified natural polymer may range from 500 000 to 2 million g/mol.

Preferably, the cationic modified natural polymer has a degree of substitution of between 0.1 and 3, preferably between 0.2 and 2.5, more preferably between 0.3 and 2.

Also preferably, the cationic modified natural polymer has a charge density of between 0.5 and 10 meq/g, more preferably between 1 and 6 meq/g.

Preferably, for the process of the invention, the cationic modified natural polymer is a cationic starch or cationic dextran.

More preferably, for the process of the invention, the cationic modified natural polymer is a cationic starch.

Therefore, preferably, for the process of the invention, the anionic modified natural polymer is an anionic guar gum and the cationic modified natural polymer is a cationic starch.

According to one embodiment of the invention, the weight ratio between the anionic modified natural polymer and the cationic modified natural polymer is between 15:1 and 5:1.

When added to the aqueous effluent, the cationic modified natural polymer and the anionic modified natural polymer may each independently be used in liquid form, solid form, suspension form, powder form or in the form of a dispersion in oil or brine. When the solid form is used, the full or partial dissolution in water thereof ca be obtained using a polymer preparation unit such as the Polymer Slicing Unit (PSU) disclosed in document EP 2 203 245. Preferably, they are added in the form of an aqueous solution or aqueous dispersion.

Advantageously, the anionic modified natural polymer and the cationic modified natural polymer can be added to the aqueous effluent when it is being transported in particular in effluent conveying lines towards storage sites used to dehydrate and solidify the treated tailings.

The storage sites may be open-air sites. They may be non-delimited land areas or closed areas e.g. a basin or cell. The steps of the process of the invention for treatment followed by land application of the effluent can be renewed at one same site leading to superimposition of layers of treated tailings. Land application can also be carried out continuously to form a mass of treated tailings from which water has been extracted.

The use of mechanical treatment can be associated with the process of the invention. In particular, said mechanical treatment units are centrifuging, pressing or filtering devices of the treated effluent. Mention can be made of thickeners, centrifuges or hydrocyclones.

The anionic modified natural polymer and the cationic modified natural polymer may independently be added in several additions, in particular alternately or in sequence. Preferably the cationic modified natural polymer is added in a single time.

The anionic modified natural polymer and the cationic modified natural polymer can be added to lines conveying the effluent towards a mechanical treatment unit, or to the effluent leaving said unit for conveying towards a storage site or towards another mechanical treatment unit. The anionic modified natural polymer and the cationic modified natural polymer can be added to a line conveying the effluent towards a storage area.

In addition to the effluent of at least one anionic modified natural polymer followed by the addition of at least one cationic modified natural polymer, the process of the invention may also comprise the separation of all or part of the water from the mixture comprising solid particles, at least one anionic modified natural polymer and at least one cationic modified natural polymer.

Preferably, when implementing the process of the invention, the separation of all or part of the water is performed on the mixture comprising the solid particles treated with at least one anionic modified natural polymer and at least one cationic modified natural polymer. Separation of the water can particularly be obtained by land application, centrifugation, pressing or filtration. Water separation is preferably obtained by land application.

In particularly advantageous manner, separation of the water allows the removal of at least 20% by weight of the water contained in the effluent. Preferably, it allows the removal of at least 30% by weight of the water contained in the effluent. More preferably, it allows the removal of at least 50% by weight, even at least 60% by weight of the water contained in the effluent. The quantity of removed water is measured 24 h after implementing the process of the invention. According to the invention measurement of the quantity of removed water is performed by evaluating the net water release (NWR) from the starting effluent, 24 h after treatment in accordance with the process.

The invention also concerns a composition comprising an aqueous effluent comprising solid particles, at least one anionic modified natural polymer selected from among anionic guar gums and/or anionic starches.

The invention also concerns a composition comprising an aqueous effluent comprising solid particles, at least one anionic modified natural polymer selected from among anionic guar gums and/or anionic starches, and at least one cationic modified natural polymer selected from among cationic starches and/or cationic dextrans and/or cationic chitosans.

The invention also concerns the use, to treat an aqueous effluent comprising solid particles, of at least one cationic modified natural polymer, preferably a cationic natural polysaccharide preferably selected from among cationic dextrans and/or cationic starches and/or cationic chitosans to treat the solid particles previously treated with an anionic modified natural polymer preferably an anionic natural polysaccharide preferably selected from among anionic guar gums and/or anionic starches.

The invention also concerns the use of at least one anionic modified natural polymer, preferably an anionic modified natural polysaccharide, preferably selected from among anionic guar gums and/or anionic starches, and of at least one cationic modified natural polymer preferably a cationic modified natural polysaccharide preferably selected from among cationic starches and/or cationic dextrans and/or cationic chitosans, for the successive treatment of solid particles contained in an aqueous effluent.

EXAMPLES

Example 1: Treatment of an MFT Sample (29.8 Weight % Dry Extract) with Different Anionic Polymers For each test, the adequate volume of 0.4 weight % anionic polymer solution was added to 200 g of MFT and the whole was manually mixed until observation of flocculation and optimum water release. The dosages of anionic polymers are expressed in g/dry Tonne of MFT. The results are summarised in Table 1 below:

TABLE 1

| Anionic modified polymer | Dosage of anionic modified polymer | NWR 24 h |
| --- | --- | --- |
| Anionic polyacrylamide | 4000 | Flocculation impossible |
| Biolam P - Hydroxypropyl guar | 4200 | 16.0% |
| Anionic guar gum 1 | 4000 | 18.5% |
| Anionic guar gum 2 | 3800 | 22.4% |
| Kelco KELZAN AP - Xanthan gum | | Flocculation impossible |
| Flocon SG 2693 - Xanthan gum | | Flocculation impossible |
| Blanose 7H9 - Carboxymethyl cellulose | | Caking, but no water release |
| Blanose 9H4F - Carboxymethyl cellulose | | Flocculation impossible |
| Blanose 7H4X - Carboxymethyl cellulose | | Caking, but no water release |
| Blanose 7M65 - Carboxymethyl cellulose | | Caking, but no water release |
| Blanose 9M31F - Carboxymethyl cellulose | | Flocculation impossible |
| HV150 - Sodium alginate | | Flocculation impossible |
| Tackidex C062 - Anionic starch | | Flocculation impossible |
| Naiaclear 900 AFAP - Anionic starch | | Flocculation impossible |
| EMES KM2NV - Anionic starch | | Flocculation impossible |
| VECTOR A180 - Anionic starch | | Flocculation impossible |

NWR = Net Water Release. It corresponds to the total quantity of water recovered during the flocculation test less the quantity of water unduly added at the time of incorporating the aqueous polymeric solution and dispersant solution to the suspension.

These results show that solely the guar derivatives form anionic modified biosourced polymers capable of flocculating MFTs.

Example 2: Treatment of an MFT Sample (29.8 Weight % Dry Extract) with a Dual 100 Biosourced Treatment: Addition of an Anionic Modified Natural Polymer of Guar Gum 2, then Addition of a Cationic Modified Natural Polymer of Starch 1 (Charge Density=1.5 Meq/g)

For each test, different volumes of 0.4 weight % anionic modified natural polymer were added to 200 g of MFTs. The mixture was mixed manually for 1 min. Different volumes of 0.4 weight % cationic modified natural polymer solution were then added in turn and the whole was mixed until the best NWR result was obtained. The polymer dosages are expressed in g/dry Tonne MFT. The results are summarised in Table 2 below:

TABLE 2

| Dosage of anionic guar 2 | Dosage of cationic starch 1 | NWR 24 h |
| --- | --- | --- |
| 4000 | 0 | 21.6% |
| 4000 | 160 | 24.0% |

TABLE 2-continued

| Dosage of anionic guar 2 | Dosage of cationic starch 1 | NWR 24 h |
|---|---|---|
| 4000 | 240 | 25.5% |
| 4000 | 320 | 27.0% |
| 4000 | 400 | 28.2% |
| 4000 | 480 | 29.8% |
| 4000 | 560 | 30.2% |
| 3600 | 0 | 8.8% |
| 3600 | 160 | 16.6% |
| 3600 | 320 | 23.9% |
| 3600 | 480 | 24.4% |

These results show that it is possible to treat MFTs with a 100% biosourced treatment duo composed of an anionic modified natural polymer such as anionic guar gum and a cationic modified natural polymer such as cationic starch.

Example 3: Treatment of an MFT Sample (44.2 Weight % Dry Extract) with 100 Biosourced Duo Treatment: Addition of an Anionic Modified Natural Polymer of Guar Gum, Followed by Addition of a Cationic Polymer For each test, different volumes of 0.4 weight % of anionic guar gum 2 were added to 200 g of MFT. The mixture was manually mixed for 1 min. Different volumes of 0.4 weight solution of cationic polymer were then added in turn and the mixture obtained was mixed until the best NWR result was obtained. Three different cationic polymers were tested: DADMAC (polydiallyldimethylammonium chloride) of low molecular weight, and two biosourced: cationic starch 1 (charge density=1.5 meq/g) and a cationic dextran (charge density=3 meq/g, molecular weight=2.5 million). The polymer dosages are expressed in g/dry Tonne MFT. The results are summarised in Table 3 below:

TABLE 3

| Dosage of anionic guar 2 | Dosage of cationic polymer | NWR 24 h |
|---|---|---|
| 5430 | 0 | 0.9% |
| 4980 | PolyDADMAC: 226 | 4.8% |
| 4525 | PolyDADMAC: 452 | 11.8% |
| 4525 | PolyDADMAC: 905 | 11.7% |
| 5430 | Cationic starch 1: 226 | 3.0% |
| 5430 | Cationic starch 1: 452 | 10.3% |
| 4980 | Cationic starch 1: 905 | 15.0% |
| 4980 | Cationic dextran: 226 | 4.5% |
| 4980 | Cationic dextran: 452 | 11.0% |
| 4525 | Cationic dextran: 905 | 17.3% |

These results show that duo treatment with an anionic modified natural polymer such as guar gum and a cationic modified natural polymer such as cationic starch or a cationic dextran lead to better results compared with treatment using a conventional cationic synthetic polymer. With the biosourced duo treatment, a constant increase in NWR was observed with increases in dosage of cationic modified natural polymer. On the other hand, when the conventional polymer was used a limited maximum NWR was observed.

The invention claimed is:

1. A process for treating an aqueous effluent comprising solid particles, said process comprising:
   (a) adding at least one anionic modified natural polymer to the effluent, wherein said anionic modified natural polymer is anionic guar gum, and
   (b) adding at least one cationic modified natural polymer selected from the group consisting of cationic starch and cationic dextran,
   wherein the effluent is selected from the group consisting of:
      effluent from the mining extraction of coal mines, diamond mines, phosphate mines, metal mines;
      effluent from the mining extraction of bituminous sand or oil sand;
      effluent comprising 5 to 70% by weight of solid particles;
      effluent comprising sand, clay and water;
      effluent comprising sand, clay, water and residual bitumen;
      effluent comprising fresh tailings; and
      effluent comprising fine tailings;
   wherein the anionic modified natural polymer has a degree of substitution of between 0.01 and 3; and
   wherein the cationic modified natural polymer has a degree of substitution of between 0.1 and 3.

2. The process according to claim 1, wherein the anionic modified natural polymer is added in an amount by weight ranging from 10 to 10 000 ppm relative to the quantity of solid particles contained in the aqueous effluent.

3. The process according to claim 1, wherein the anionic modified natural polymer has a molecular weight ranging from 3 to 50 million g/mol.

4. The process according to claim 1, wherein the anionic modified natural polymer has a charge density of between 0.1 and 15 meq/g.

5. The process according to claim 1, wherein the cationic modified natural polymer is a cationic starch.

6. The process according to claim 1, wherein the cationic modified natural polymer is added in an amount by weight ranging from 50 to 1 000 ppm relative to the quantity of solid particles contained in the aqueous effluent.

7. The process according to claim 1, wherein the cationic modified natural polymer has a molecular weight ranging from 100 000 to 50 million g/mol.

8. The process according to claim 1, wherein the cationic modified natural polymer has a charge density of between 0.5 and 10 meq/g.

9. The process according to claim 1, wherein the weight ratio between the anionic modified natural polymer and the cationic modified natural polymer is between 15:1 and 5:1.

10. The process according to claim 1, also comprising the separation of all or part of the water from the mixture of solid particles treated with an anionic modified natural polymer and a cationic modified natural polymer.

11. The process according to claim 10, wherein at least 20% by weight of water is separated.

12. The process according to claim 1, wherein the fine tailings in the effluent are selected from the group consisting of:
   fresh fine tailings (FFTs); and
   mature fine tailings (MFTs).

13. The process according to claim 1, wherein the metal mines are selected from the group consisting of aluminium mines, platinum mines, iron mines, gold mines, copper mines, and silver mines.

14. A method of treating solid particles contained in an aqueous effluent comprising adding to said aqueous effluent at least one anionic modified natural polymer comprising anionic guar gum, and at least one cationic modified natural polysaccharide selected from the group consisting of cationic starches and cationic dextrans,
   wherein the anionic modified natural polymer has a degree of substitution of between 0.01 and 3; and
   wherein the cationic modified natural polysaccharide has a degree of substitution of between 0.1 and 3.

15. A composition comprising an aqueous effluent comprising solid particles, at least one anionic modified natural polymer comprising anionic guar gum and at least one cationic polymer selected from the group consisting of cationic starches and cationic dextrans,
   wherein said effluent is selected from the group consisting of:
     effluent from the mining extraction of coal mines, diamond mines, phosphate mines, or metal mines;
     effluent from the mining extraction of bituminous sand or oil sand;
     effluent comprising 5 to 70% by weight of solid particles;
     effluent comprising sand, clay and water;
     effluent comprising sand, clay, water and residual bitumen;
     effluent comprising fresh tailings; and
     effluent comprising fine tailings;
   wherein the anionic modified natural polymer has a degree of substitution of between 0.01 and 3; and
   wherein the cationic modified natural polymer has a degree of substitution of between 0.1 and 3.

16. The process according to claim 15, wherein the metal mines are selected from the group consisting of aluminium mines, platinum mines, iron mines, gold mines, copper mines, and silver mines.

* * * * *